Dec. 13, 1966 G. L. BARNES ETAL 3,292,151

MEMORY EXPANSION

Filed June 4, 1962 4 Sheets-Sheet 1

INVENTORS
GORDON L. BARNES
JAMES R. GREAVES
MICHAEL A. MUSCATELL
JERRY L. TOEPFER
BY Gunter A. Hauptman
ATTORNEY Dec. 13, 1966 G. L. BARNES ETAL 3,292,151

MEMORY EXPANSION

Filed June 4, 1962 4 Sheets-Sheet 2

FIG. 4a
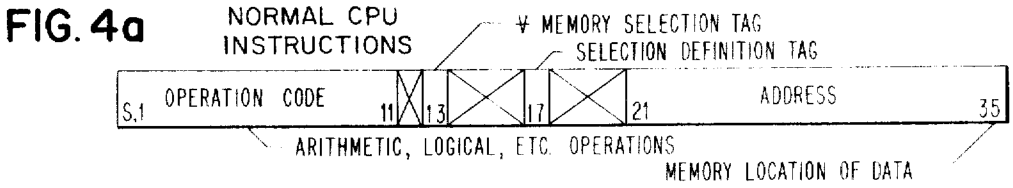
FIG. 4b
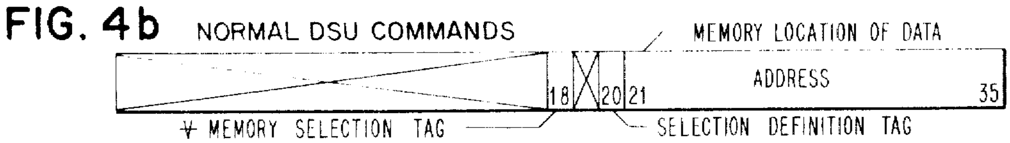
FIG. 4c
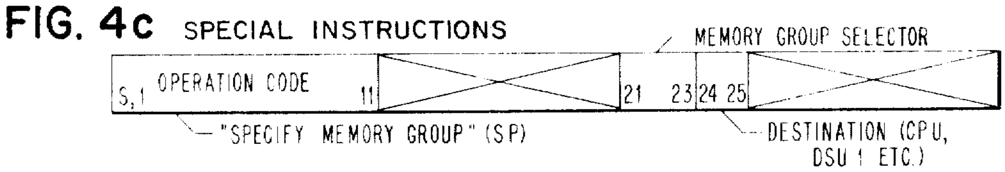
FIG. 4d
| GROUP SELECTED BY SPECIAL INSTRUCTION | (BITS 21-23) | MEMORY SELECTED BY NORMAL CPU INSTRUCTION | | |
|---|---|---|---|---|
| | | TAG 17=1 (AND) | TAG 17=0 (∀) | |
| | | | TAG 13=1 | TAG 13=0 |
| A,B | (000) | AB | A | B |
| A,C | (001) | AC | A | C |
| A,D | (010) | AD | A | D |
| B,C | (011) | BC | B | C |
| B,D | (100) | BD | B | D |
| C,D | (101) | CD | C | D |
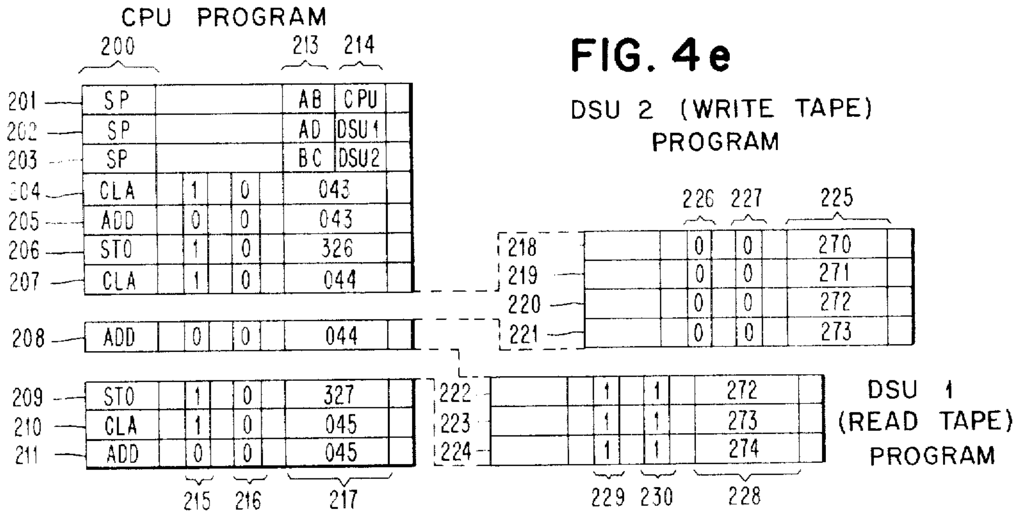
FIG. 4e United States Patent Office 3,292,151

Patented Dec. 13, 1966

3,292,151

MEMORY EXPANSION

Gordon L. Barnes, Poughkeepsie, James R. Greaves, Staatsburg, Jerry L. Toepfer, Poughkeepsie, and Michael A. Muscatell, Hyde Park, N.Y., assignors to International Business Machines Corporation, New York, N.Y., a corporation of New York Filed June 4, 1962, Ser. No. 199,695
16 Claims. (Cl. 340—172.5)

This invention relates to electronic apparatus. More particularly, this invention relates to apparatus which permits the expansion of the size of an addressable memory in an electronic data processing system, where the size of the addressing facility is limited.

As is well known, electronic data processing systems utilize storage devices, called memories, having a plurality of addressable locations. Each addressable location is used to store a piece of information usually called a word. Each word comprises a number of bits stored as states representing either a one or a zero. Sometimes individual bits are addressable though usually an address refers to the location of the bits comprising an entire word. The number of locations available in a memory for the storage of words is limited by the physical size of the memory, additional memory locations being provided by adding physical units. Every available word location is identified by an address which specifies the position of a word in the memory. The more memory locations there are, the longer the address must be. If the address length is limited, the number of memory locations usable in a prior art system cannot exceed a fixed maximum. For example, assume that only 15 binary orders are available for addressing locations in memory. The maximum decimal number expressed by 15 bits is 32,767 (referred to as 32K). If the first memory location is numbered 00,000 then only 32,768 locations may be specified by 15 address bits. Thus the address length fixes the maximum memory size. If additional memory locations must be provided in the system, it becomes necessary to increase the address length, each additional address bit permitting the memory capacity to be doubled. Therefore, if three additional bits are provided for addressing making a total of 18 bits, then up to 262,144 memory word locations may be provided in the system.

It is common practice to gain access to memory locations in an electronic data processing system by means of fixed-length instruction words which are stored in memory. Each instruction word has a specified format comprising a number of bits fixed by the size of word permitted by the memory. A portion of each instruction word called an "address field" is used for specifying the address of a memory location holding another word. The more bits of the instruction utilized for purposes of addressing, the less are available for the other functions of the instruction. Since the instruction length is limited, the number of bits available for addressing are limited also. In the prior art additional address bits have been supplied in an instruction word at the expense of bits, in the word, having other functions. An alternative prior art solution has been to utilize an additional instruction word to switch either one of two memory units into the system for accessing by the address fields of subsequent instructions.

It is an object of this invention to permit a fixed length address to gain access to a number of memory locations in excess of the largest number that may be expressed by the address.

It is another object of this invention to provide apparatus for permitting the memory capacity of a data processing system to be multiplied by factors greater than two without proportionally increasing the number of instruction word bits allotted for addressing the memory.

Still another object is to provide apparatus wherein the addition of one bit to the address portions of the instructions permits the number of locations specifiable to be more than double.

A further object of this invention is to provide apparatus for permitting the addition of storage locations to the memory of an electronic data processing system without increasing the size of the address portions of the instructions used in the system.

Still another object is to permit instructions, in a program of instructions, each specifying the same address to refer to different memories.

The foregoing and other objects, features and advantages of the invention will be apparent from the following more particular description of the preferred embodiment of the invention, as illustrated in the accompanying drawings.

These objects are obtained in the apparatus described in this application by providing a special instruction, having a group selector field, which special instruction precedes normal instructions. The group selector field of the special instruction specifies a group of memories out of the total number of memories available. For example, if the memory locations are divided among four separate memories A, B, C and D, the group selector may specify any pair of the memories, such as: A and B, B and C, C and D, etc. The group of memories selected by the special instruction preceding a normal instruction remains selected until another special instruction occurs. The address field of every normal instruction following a special instruction will refer to a location in one of the group of memories specified by the group selector field of the special instruction. Which one of the memories in the selected group the address refers to is determined by a "tag bit" associated with the address of the normal instruction. The tag bit may be one of the address bits or it may be an extra bit. For example, if the group selector field of a special instruction specifies memories A and B, the tag bits of following normal instructions will select memory A if the tag bit is a one, or memory B if the tag bit is a zero, for accessing by the associated address fields of the normal instruction. Provision may be made for having the address fields of normal instructions simultaneously refer to all memories in the group selected by a preceding special instruction. Further, different types of normal instructions, applicable to autonomous parts of the systems, may select locations from different memory groups if a special instruction is provided for each type of normal instruction.

Figure 2:
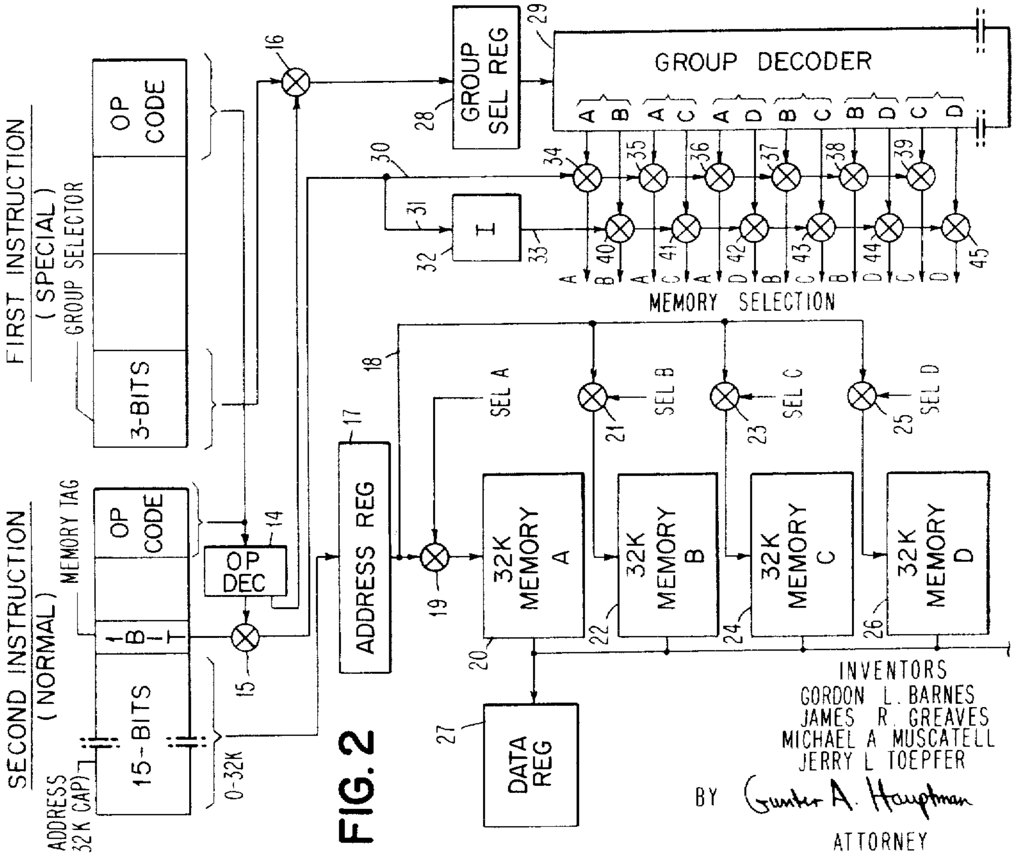
FIGURE 2 is a diagram generally showing a data processing system embodying the invention.
Figure 3A:
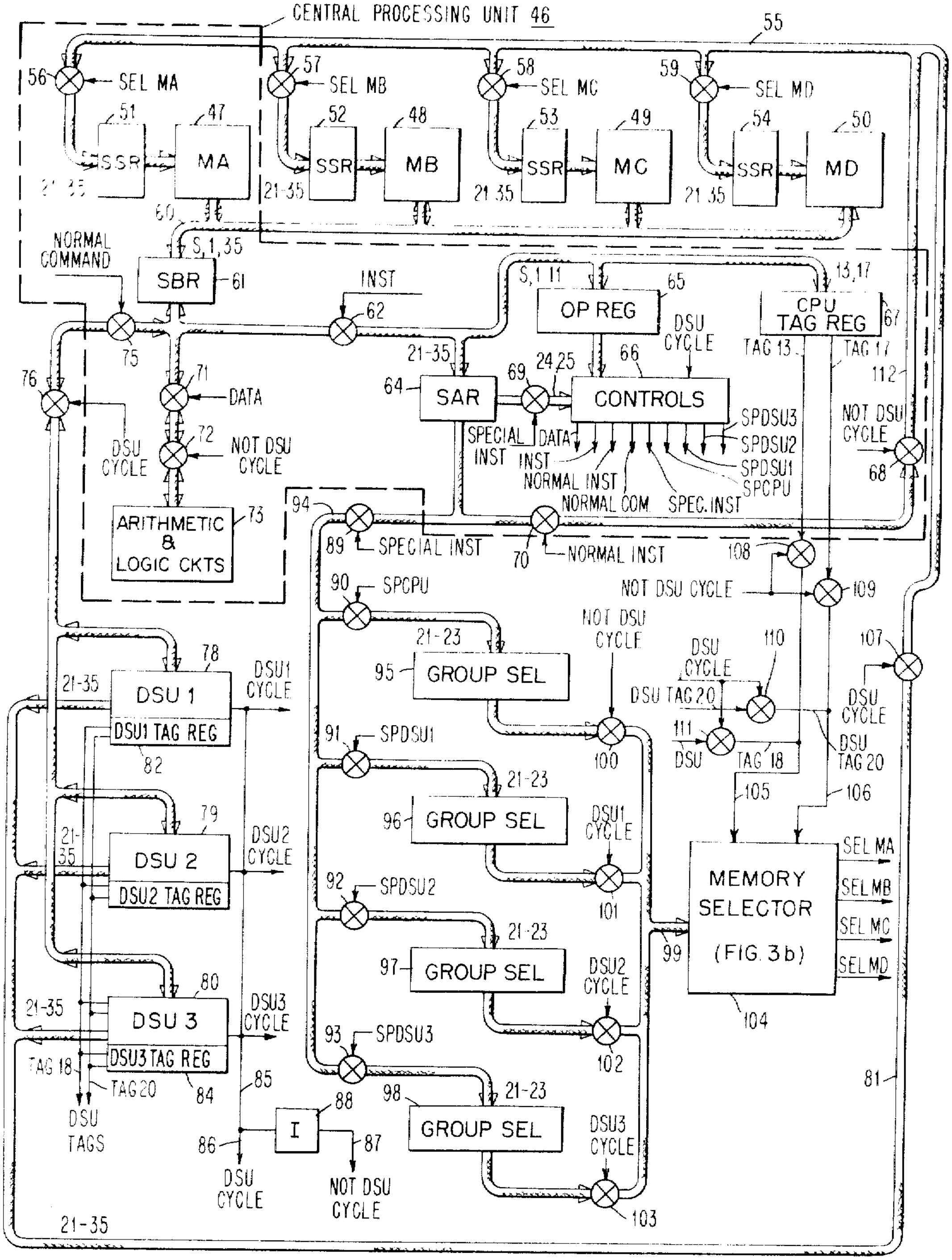

FIGURE 3*a* is a detailed logic diagram of the electronic data processing system shown generally in FIGURE 2.

Figure 3B:
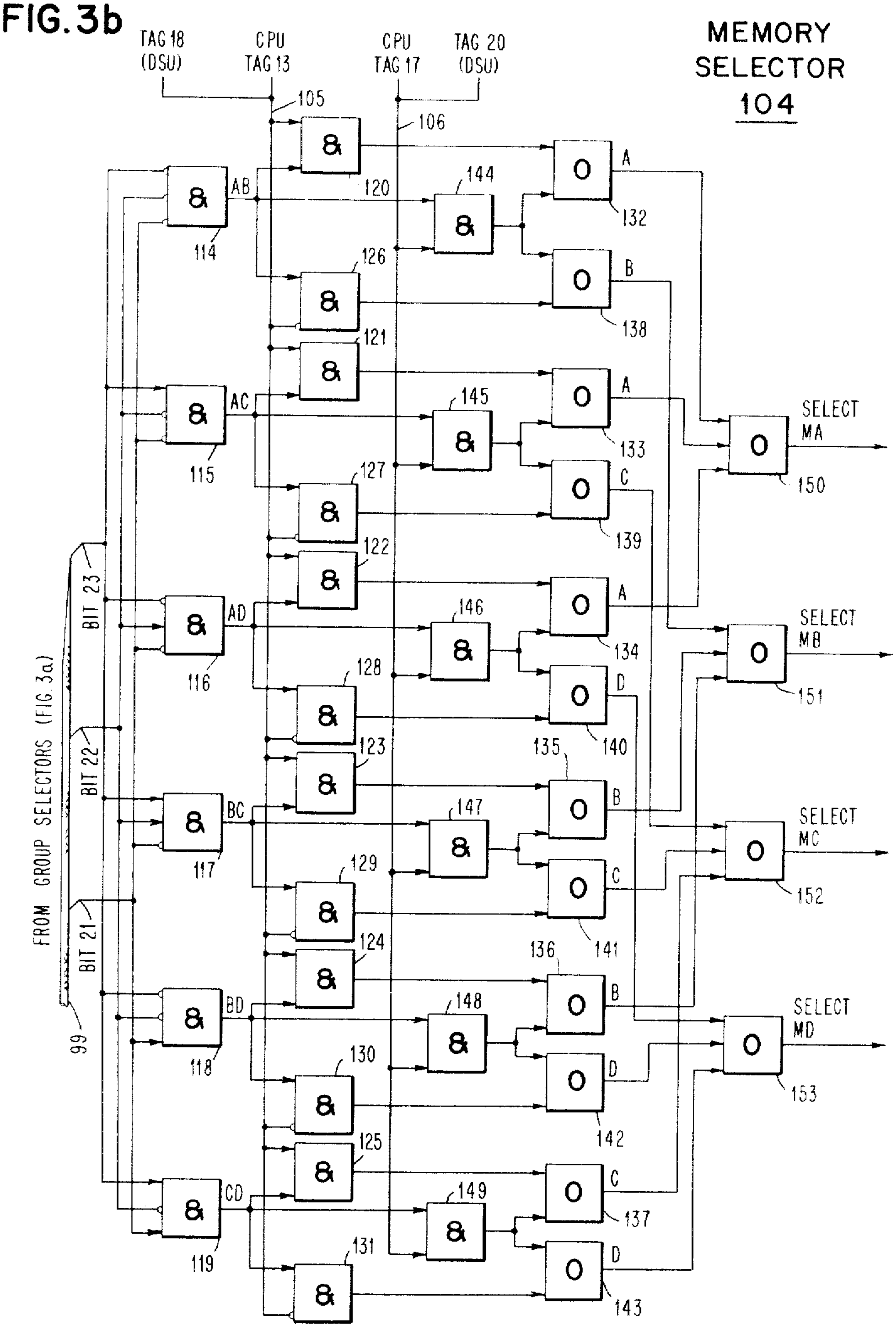

FIGURE 3*b* is a logic diagram of a memory selector used in the system of FIGURE 3*a*.

FIGURES 4*a*, 4*b* and 4*c* are diagrams illustrating the format of instructions usable in the data processing system of FIGURE 2 and FIGURE 3*a*.

FIGURE 4*d* is a table illustrating the significance of specified positions in the formats of the instruction formats shown in FIGURES 4*a*, 4*b* and 4*c*.

FIGURE 4*e* is a diagram illustrating a sample program of the instructions shown in FIGURE 4*a*, 4*b* and 4*c* usable in the system shown in FIGURE 2 and FIGURE 3*a*.

*General description*

Figure 1:
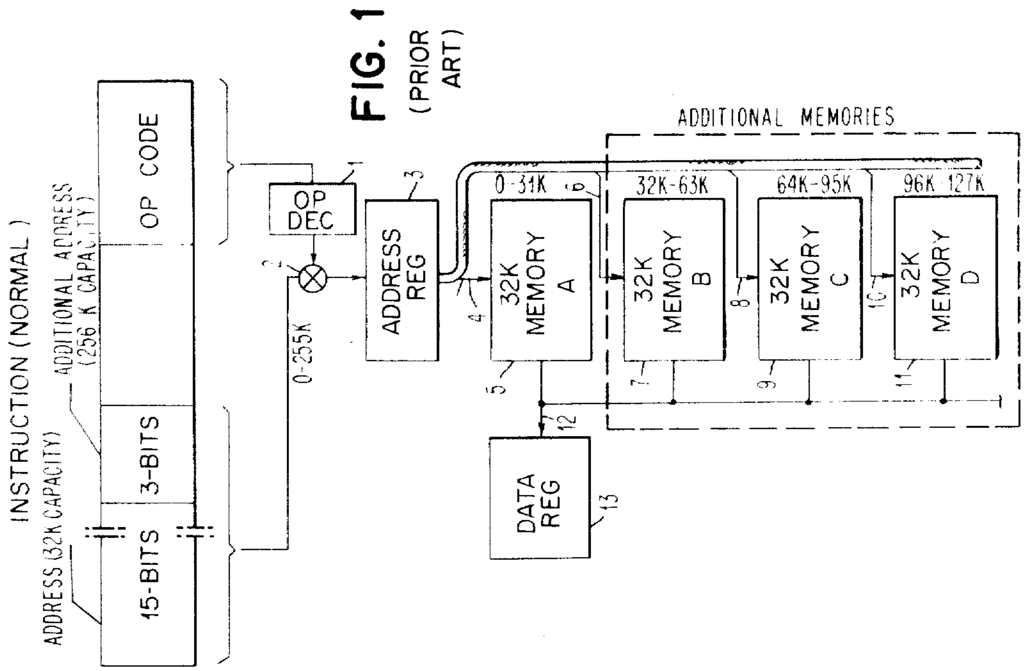
FIG. 1 (PRIOR ART)
FIGURE 1 is a diagram showing a prior art device for increasing the memory capacity of a data processing system.

Referring to FIGURE 1 there is shown a prior art device for increasing the memory capacity of a data processing system. The data processing system is operated by normal instructions having a format divided into several fields which include an operation (op.) code field and an address field. The length of the address field determines the memory capacity of the system. If the address field has 15 bits, as shown, then the memory capacity is 32,768 (32K) word locations. If the address field is increased by an additional address field of three bits, then the memory capacity of the system is tripled to 262,144 (262K) word locations.

The operation code portion of the instruction code format specifies an operation to be performed upon the information stored at the location specified by the address portion of the instruction. The operation code portion is placed in an operation decoder 1 which, among its functions, operates a gate 2 to transfer the 15-bit normal address field and the three-bit additional address field to an address register 3, which thus contains an 18-bit address capable of addressing 262,144 word locations in memory. The memory originally supplied with the system is 32,768 (32K) word location memory 5 every location of which may be addressed by the original 15-bit address field of the instruction word. The three additional bits added to the address portion of the instruction enable the locations in three more memories 7, 9 and 11 to be addressed. Additional memories, not shown, together with the four memories 5, 7, 9 and 11 give a total capacity of 262,144 (262K) word locations. When the address register three contains an address 0 through 32,767, the address will be sent to the memory 5 via cable 4. If the address is 32,768 through 65,535 it will be sent to the memory 7 via the cable 6. If the address is 65,536 through 98,303 the address will be transferred from the address register 3 to the memory 9 via the cable 8. If the address is 98,304 through 131,071 the address in the address register 3 will be transferred via cable 10 to the memory 11. It is obvious that addresses 131,072 to 262,143 may be sent to four additional memories not shown. In this way, the contents of any one of 262,144 locations contained in a number of memories, each having 32,768 locations, may be gained access to. Data at an addressed location in any one of the memories is transferred via cable 12 to a data register 13.

It is evident from the preceding description of FIGURE 1 that an extra bit must be added to the address field of the instruction word every time that the memory capacity is doubled. It will now be shown how an increase in memory capacity may be obtained with the addition of only one bit to address fields of normal instructions.

Referring now to FIGURE 2, there is shown a diagram of apparatus embodying the invention. A normal instruction comprises an operation code, a 15-bit address field and a one-bit memory tag, for addressing, as an illustration, four memories having 32,768 memory locations each. The 15-bit address field may specify any one of 32,768 (32K) word locations in any one of the memories 20, 22, 24 and 26. Four additional memories, giving a total of 262,144 locations, may be provided but are not shown. The memory tag bit is used to specify one of a pair of the memories 20, 22, 24 and 26 selected by a group selector field in a preceding special instruction. A special instruction comprises an operation code, which identifies the instruction as a special instruction, and a three-bit group selector field, each unique code of which may identify two memories out of a larger group of up to eight memories. A special instruction always precedes a number of normal instructions, any number of normal instructions following one special instruction. The memory tag bit of each one of the normal instructions specifies which one of the pair of memories, selected by the group selector field of the special instruction, the address field of the normal instruction is to refer to. Every normal instruction following a special instruction may refer to either one of the pair of selected memories.

The operation code field of every instruction is placed in an operation decoder 14 which recognizes the instruction as being either a special or a normal instruction. If a special instruction is recognized gate 16 is operated to pass the three-bit group selector field of the special instruction into the group selector register 28. A group decoder 29 is operated, in accordance with the configuration of the three-bit group selector field in the group selector register 28, to specify a pair of memories by placing signals on one pair of the pairs of output lines A and B, A and C, A and D, B and C, etc. Only one pair of these lines may be selected at a time. Associated with each one of these lines is one of the gates 34 through 45. The gates 34 through 39 are enabled by a signal on line 30 to pass the left hand one of the pair of outputs currently activated by the group decoder 29. The gates 40 through 45 are enabled by a signal on the line 33 to select the right hand one of the pair of lines correctly activated by the group decoder 29. The signal on the line 33 is the inverse of the signal on the line 30, since it passes through inverter 32 via line 31. As a result, if there is a 1-bit on the line 30 the left hand line of the pair of lines activated by the group decoder 29 will pass a signal, whereas if there is a 0-bit on the line 30 the signal on the right hand line of the pair will be passed.

If the operation decoder 14 recognizes a normal instruction gate 15 is enabled instead of gate 16. The operation of gate 15 sends the memory tag of the normal instruction to the line 30, causing one of the pair of memories previously selected by a special instruction to be specified as described above. The 15-bit address field of the normal instruction is passed to an address register 17, which then specifies one of 32,768 memory locations via the bus 18. The location specified on the bus 18 is applied to each one of gates 19, 21, 23 and 25. One, and only one, of these gates is operated by the group decoder 29 memory selection output specified by the preceding special instruction group selector field and the current normal instruction memory tag field. Therefore, the address on the bus 18 will be passed to one of the memories 20, 22, 24 and 26 by operation of one of the gates 19, 21, 23 and 25. The data at the location specified by the address register 17 in the memory to which the address has been transferred will be sent to the data register 27.

Still referring to FIGURE 2, the operation of the invention will be described. Assume that the group selector field of a special instruction selects the memories B and C and that the memory tag field (which contains a 1-bit) of a subsequent normal instruction specifies that the left hand memory of the selected group be used. Assume also that the address field of the normal instruction indicates address 2045. When the operation code of the special instruction is recognized by the operation decoder 14, the group selector field of the special instruction is placed into the group selector register 28 via the gate 16. The group decoder interprets the 3-bit group selector field stored in the group selector register 28 as referring to memories B and C. As a result signals are applied by the group decoder 29 to the gate 37 and to the gate 43. When the operation decoder 14 recognizes the operation code of the normal instruction address 2045 is sent to the address register 17 and the gate 15 is operated to transfer the memory tag a (1-bit) to the lines 30 and 31. The memory tag (1-bit) specifies the left hand memory of the selected pair, the gates 34 through 39 will be enabled and the gates 40 through 45 will be blocked. The group decoder 29 having applied a signal to one of the selected gates, gate 37, an output signal select B will be applied to the gate 21 connecting the bus 18, from address register 17, to the memory 22. The address 2045 in the address register 17 is transferred via the bus 18 and the gate 21 to the memory 22. The data at the location 2045 of memory 22 will be placed in the data register 27.

If another normal instruction follows the described normal instruction, the location specified in its address field will be removed from one of the two memories 22 or 24, since the group decoder 29 holds the gates 37 and 43 operated. If the memory tag of this normal instruction is a 1-bit the data will be removed from the indicated location in memory B. If however, the memory tag is a 0-bit a signal will emerge from the inverter 32 via line 33 to gate 43 causing operation of gate 23; data, as a result, emerging from memory C rather than memory B. Subsequent normal instructions will operate in a similar manner giving the address field access to one of the two memories B or C. If another special instruction is recognized by the operation decoder 14 the pair of memories selected may be changed in accordance with the group selector field of the special instruction. Subsequent normal instructions will thereafter refer to one of the new pair of memories.

*Detailed description*

Referring now to FIGURE 3*a* there is shown a logic diagram of a data processing system embodying the invention. The data processing system is divided into a central processing unit 46 and into a number of data synchronizer units 78, 79, 80. The central processing unit 46 performs arithmetic and logical operations in an ALU circuit 73. The data synchronizers 78, 79 and 80 each perform input and output operations in association with peripheral devices not shown. The central processing unit 46 and the data synchronizer units 78, 79 and 80 share a set of memory units 47, 48, 49 and 50. One of the memory units 47 is initially a part of the central processing unit 46, whereas the memory units 48, 49 and 50 are additional units. Instruction words (shown in FIGURES 4*a*, 4*b* and 4*c* described below), each comprising 36-bits, referring to either the central processing unit 46 or to the data synchronizer units 78, 79 and 80 are stored in the memories 47, 48, 49 and 50, as are 36-bit data words. Any instruction word or data word may be accessed by transferring a 15-bit address from a storage address register SAR 64 to one of the storage select registers SSR 51, 52, 53 and 54. The contents of the accessed location are placed into a storage buffer register SBR 61 via a cable 60. The accessed location may contain either an instruction word or a data word. The operation register 65 receives instruction words from the storage buffer register SBR 61 via gate 62 and the ALU 73 receives data words via gates 71 and 72. Instruction words may also refer to the data synchronizer units 78, 79 and 80 in which case they are called "DSU commands." DSU commands are transferred from the storage buffer register SBR 61 to the data synchronizer units 78, 79 and 80 via the gates 75 and 76. The control 66 (to be described), among other functions, identifies information in the storage buffer register SBR 61 as a data word or as an instruction word and also routes instructions and DSU commands in accordance with signals on the DSU cycle line 86 which indicates that a data synchronizer 78, 79 or 80 has access to a memory.

A complete explanation of the central processing unit 46 is described in U.S. Patent No. 3,019,976, issued February 6, 1962 on an application by J. M. Taylor titled "Data Processing System Including an Indicating Register," Serial No. 705,444, filed December 26, 1957, now Patent No. 3,019,976, and assigned to the International Business Machines Corporation. The data synchronizer units 78, 79 and 80 and their connection to the central processing unit 46 are described in detail in an application titled "Data Synchronizer" by C. L. Christiansen et al., Serial No. 705,447, filed December 26, 1957 and assigned to the International Business Machines Corporation. Both of these patents are incorporated herein by this reference.

Still referring to FIGURE 3*a*, the apparatus unique to the invention will now be described. The controls 66 are adapted to identify, in accordance with a 12-bit operation code field (bits S, 1–11) stored in the operation register 65 by a current instruction, the nature of the current instruction in the storage buffer register SBR 61 as a normal instruction, or a special instruction (SPCPU, SPDSU 1, SPDSU 2 or SPDSU 3) or a normal DSU command referring to one of the three data synchronizers 78, 79 and 80. If the controls 66 indicate that the current instruction in the storage buffer register is a special instruction (SPCPU, SPDSU 1, SPDSU 2 or SPDSU 3) one of the gates 90, 91, 92 or 93 is operated allowing a corresponding one of the group selector registers 95, 96, 97 or 98 to receive a 3-bit group selector field (bits 21–23) from the storage buffer register SBR 61. Though only one of the group selector registers 95 through 98 at a time may be filled by the storage buffer register SBR 61, all may simultaneously contain a value. The contents of the group selector registers 95 through 98 are made available, one at a time; to a memory selector 104 (described below with reference to FIGURE 3*b*) in accordance with which of the data synchronizers 78, 79 and 80, if any, has access to the memories. If the central processing unit 46 has access to the memories it follows that no data synchronizer has access, the DSU cycle line 86 as a result applying a signal to the Not DSU line 87 via an inverter 88 causing the gate 100 to connect the group selector register 95 to the memory selector 104. If one of the data synchronizers 78, 79 and 80 has access to the memories (to the exclusion of the central processing unit 46) a connected one of the gates 101 through 103 will cause a corresponding one of the group selector registers 96 through 97 to be connected to the memory selector 104.

A CPU tag register 67 receives two bits (tag 13 and tag 17) of normal instructions, which bits are sent to inputs 105 and 106 of the memory selector 104 via gates 108 and 109 if the central processing unit has access to the memories. Each one of the data synchronizers 78, 79 and 80 has associated with it a DSU tag register 82, 83 and 84 for receiving two bits (tag 18 and tag 20) of normal DSU commands directed to the corresponding data synchronizer. These two bits are sent to the memory selector inputs 105 and 106 via gates 110 and 111 at the times that the corresponding data synchronizer has access to the memories. In accordance with the contents of one of group selector registers 95 through 96 and the signals at inputs 105 and 106, the memory selector 104 will activate one, or more, of the gates 56, 57, 58 and 59 connecting the address bus 55 to the storage select registers 51, 52, 53 and 54. As a result information at a location specified by either the storage address register SAR 64 or one of the data synchronizers 78 through 80 will be accessed from one, or more, of the memories 47 through 50 selected by the memory selector 104.

Referring now to FIGURE 3*b*, the circuitry of the memory selector 104 will be described. The memory selector 104 receives via cable 99 inputs from one of the group selectors 95, 96, 97 or 98 in accordance with the operation of one of the gates 100, 101, 102 and 103. The information on the cable 99 comprises three bits 21 through 23 which are applied to AND circuits 114 through 119. An AND circuit will have an output if each one of its "true" inputs (indicated by arrows) has a 1-bit applied to it and each one of is "complement" inputs (indicated by a semi-circle) has a 0-bit applied to it. The inputs to the AND circuits 114 through 119 are connected to the lines from the bus 99 in such a manner that each one of five unique configurations (eight are possible) of bits 21 through 23 will cause an output from a different one of the AND circuits 114 through 119. Reference is made to the table shown in FIGURE 4*d*, to be explained later, which shows the outputs resulting from different input combinations. The output in each one of AND circuits 114 through 119 is labelled by two letters, for example, AB, indicating a pair of memories selected by the special instruction which supplied bits 21 through 23. Tags in subsequent normal instructions may cause both memories of the selected pair, or a specified one of the pair, to be accessed. The memory selector 104 receives at line 106 inputs from the tag 17 of normal CPU instructions and tag 20 of normal DSU commands, which indicate whether both (1-bit), or only one (0-bit) of the pair of memories is to be accessed. The line 106 enables each one of AND circuits 144 through 149, if a 1-bit appears on it; each of AND circuits 144 through 149 also receive an input from a corresponding one of AND circuits 114 through 119. Therefore if there is a 1-bit on line 106 indicating that the pair of memories indicated by one of AND circuits 114 through 119 are both to be accessed, then there will be an output from the one of AND circuits 144 through 149 which corresponds to the one of AND circuits 114 through 119 which has an output. The one AND circuit of AND circuits 134 through 139 which has an output applies a signal to two OR circuits of the OR circuits 132 through 143. Each one of the OR circuits 132 through 143 causes the selection of a particular memory via one of the OR circuits 150 through 153. As a result, a signal from one of the AND circuits 144 through 149 will cause the selection of two memories as indicated by a signal on two of the select outputs from the OR circuits 150 through 153.

If, on the other hand, there is a 0-bit applied on line 106, the particular memories selected will not be determined by the AND circuits 144 through 149. Rather, the condition on line 105, specified by tag 18 of normal DSU commands and tag 13 of normal CPU instructions will cause one only of the pair of memories selected by the input on bus 99 to be accessed. Each one of the AND circuits 114 through 119 supplies an input to two of the AND circuits 120 through 131. The line 105 is connected as a "true" input to AND circuits 120 through 125 and as a "complement" input to AND circuits 126 through 131. Therefore, an output from one of AND circuits 114 through 119 will cause an output from one of AND circuits 120 through 125 if the signal on line 105 is a 1-bit, and an output from one of AND circuits 126 through 131 if the signal on line 105 is a 0-bit. In this way, a single bit in a normal CPU instruction or a normal DSU command selects one memory out of a pair of pre-selected memories, since the output of each one of the AND circuits 120 through 131 is connected to an input of one of the OR circuits 132 through 143. The particular one of the OR circuits 132 through 143 which receives an input from one of the AND circuits 120 through 131 applies a signal to one of the OR circuits 150 through 153 to cause a signal on one of the selection lines. Reference is again made to the table of FIGURE 4*d* illustrating the selection of one of a pair of memories in accordance with signals on line 105.

The instructions stored in the memories 47, 48, 49 and 50 and utilized by the central processing unit 46 and the data synchronizers 78, 79 and 80 will now be described with reference to FIGURES 4*a*, 4*b* and 4*c*. A normal central processing unit instruction is shown in FIGURE 4*a*. The instruction format includes 36 bits arranged into a number of fields. Bits S (sign) and 1 through 11 are called the operation code field which specifies an operation to be performed by the central processing unit 46. For example, this field may indicate that two numbers are to be added. Bits 21–35 are called the address field, indicating the location of a word in any one of 32,768 memory locations. This field is fixed in length but may apply to any one of the memories 47, 48, 49 or 50 in FIGURE 3*a*. Bit 13 is an exclusive-OR (⩛) memory selection tag which indicates that one of a pair of the memories 47, 48, 49 or 50 is to be referred to by the address field. The particular pair of memories from which the selection is made is specified in the memory group selector field of a preceding special instruction to be explained with reference to FIGURE 4*c*. Bit 17 is selection definition tag for indicating that the address field applies to the particular memory selected by bit 13 or, regardless of bit 13, to both memories of the pair. For example, if bit 17 is a 1-bit, then the address field refers simultaneously to both memories defined by the memory group selector field of a preceding special instruction.

FIGURE 4*b* shows the format of a normal data synchronizer unit (DSU) command which comprises 36 bits arranged into a number of fields, of which the address field and two tags are of interest here. Normal data synchronizer unit commands are stored in the memories 47, 48, 49 and 50 in association with normal CPU instructions. However, whereas normal CPU instructions control operations in the central processing unit 46, the normal DSU commands control operations in the data synchronizer units 78, 79 and 80. Each normal DSU command is directed to a particular data synchronizer unit for execution. Bit 18 is an Exclusive-OR (⩛) memory selection tag analogous to bit 13 of a normal CPU instruction. Bit 20 is a selection definition tag analogous to bit 17 of the normal CPU instruction. The address field (bits 21 through 35) is analogous to the address field of normal CPU instructions.

FIGURE 4*c* shows the format of 36-bit special instructions which precede normal CPU instructions and normal DSU commands. The 12-bit operation code field bits S and 1 through 11 is used to identify the instruction as a special instruction. The memories group selector field bits 21 through 23, indicates by the permutation of binary bits one pair of up to eight memories, as will be explained in detail with reference to FIGURE 4*d*. One of the pair specified by the memory group selector field of a special instruction will be selected for accessing by an address field of a normal CPU instruction or a normal DSU command in accordance with the Exclusive-OR memory selection tag of the normal instruction or command. The destination field bits 24 and 25 of each special instruction indicate by their configuration whether the memory group specification field is to be operative with respect to the central processing unit 46 or to a specified one of the data synchronizer unit 78, 79 or 80.

FIGURE 4*d* is a table which illustrates the cooperative effect of the memory group selector field of special instructions shown in FIGURE 4*c* and the tag bits 13 and 17 of a normal CPU instruction shown in FIGURE 4*a*. (The effect of tags 18 and 20, respectively, of normal DSU commands shown in FIGURE 4*b* are analogous.) The bit configuration of the memory group selector field bits 21 through 23 of a special instruction may indicate any one of six combinations of the memories A(47), B(48), C(49) and D(50). Since three bits may indicate up to eight combinations, additional memories may be provided if desired. The selection definition tag bit 17 of a normal CPU instruction indicates whether the address specified by the address field of the instruction is to refer to one, or both, of the group of memories specified by the bits 21 through 23. If there is a 1-bit in the tag 17 position an AND function is performed, that is, both selected memories will be accessed simultaneously. If the tag 17 is a 0-bit, then an Exclusive-OR function is performed. In the case of a 0-bit the particular one of the pair specified by bits 21 through 23 is selected by the condition of tag 13. If the memory selection tag 13 is a 1-bit then the left hand one of the pair specified by the bits 21 through 23 of the special instruction will be accessed by the address field (bits 21 through 35) of the normal instruction. If the bit 13 of the normal instruction is a 0-bit then the address field of the normal instruction will refer to the right hand memory of the pair of memories specified by the special instruction bits 21 through 23. For example, if a special instruction memory group selector field contains the binary value 011, the pair of memories B and C will be specified. If a subsequent normal instruction has a selection definition tag 17 which is a 0-bit and an Exclusive-OR memory selection tag 13 which is a 1-bit, memory B will be accessed by the address field of the normal instruction.

Referring again to FIGURES 3*a* and 3*b*, the operation of the illustrated system will be described with reference to a program of instructions shown in FIGURE 4*e*. FIGURE 4*e* shows in tabular form programs of instructions stored in one or more of the memories 47 through 50 of FIGURE 3*a*. Three programs are shown: A CPU program, a program for data synchronizer 79 and another program for data synchronizer 78. The CPU program is performing an arithmetic operation, data synchronizer 78 (DSU 1) is reading information from a tape and data synchronizer 79 (DSU 2) is writing information onto another tape. Since, in accordance with the above referenced Christiansen et al, patent, all three operations may be performed substantially simultaneously the three programs are normally stored in separate groups of memory locations. The instructions of the CPU program are executed one after another, usually in the order of storage as explained in the above referenced Taylor patent. When one of the data synchronizer units 78 or 79 requires service, that is it is ready to transfer information between it and a storage location, the CPU program execution will be interrupted and one or more instructions of a DSU program will be executed, as is explained in the Christiansen et al. patent.

In the CPU program the operation code of each instruction is specified in the column 200. Thus, the first three CPU instructions 201 through 203 are special "specify memory group" instructions which specify a pair of memories indicated in column 213 of the three instructions 201 through 203. Column 213 is the memory group selector field (bits 21–23) in FIGURE 4*c*. Column 214 of the three instructions 201 through 203 corresponds to the destination field (bits 24 and 25) of the special instructions shown in FIGURE 4*c* which indicates that instruction 201 refers to the CPU, instruction 202 refers to data synchronizer 78 (DSU 1) and instruction 203 refers to data synchronizer 79 (DSU 2). Instructions 204 through 212 perform arithmetic operations indicated in column 200 as: (CLA), clear the accumulator and enter the data word at the indicated memory location (ADD), add the data word at the indicated location to the accumulator contents, the sum appearing in the accumulator; and (STO), store the sum in the accumulator at the indicated location. The address field bits 21–35 of each instruction is indicated in column 217. Note that for instructions 204 and 205, 207 and 208 and 210 and 211 the address is the same. The address for each pair however refers to a different memory for each instruction as indicated by the value of the memory selection tag (bit 13) in column 215. Since the CPU special instruction 201 has preselected memories A and B, address 043 of instruction 204 refers to memory A and address 043 of instruction 205 refers to memory B. Column 216 represents the selection definition tag bit 17, which is a 0-bit indicating that only one of the preselected pair of memories is referred to.

After the execution of CPU instruction 207, the CPU program is interrupted for the execution of DSU commands 218 through 221. These commands are used to remove four data words from four memory locations indicated in column 225. Column 226, which corresponds to the memory selection tag 18, is a 0-bit in each one of the commands 218 through 221. This indicates that memory A of the pair of memories (A and D) preselected by special instruction 203 is the one from which data is to be read. The CPU program is resumed after the execution of command 221 but is interrupted once more after execution of instruction 208 in order to service the data synchronizer 78 by execution of three commands 222 through 224. These three commands place data words into memory locations specified in column 228. Column 230 which is the selection definition tag (bit 20) is a one-bit indicating that both of the memories specified by the instruction 202 are accessed simultaneously. The contents of column 229, the memory selection tag bit 18 therefore has no significance. After the execution of command 224 the CPU program is again resumed.

The steps in the execution of the program in FIGURE 4*e* will now be explained with reference to FIGURES 3*a* and 3*b*.

The first instruction 201 of the CPU program is placed into the storage buffer register 61 via the cable 60. The controls 66 at this time indicate that this is an instruction cycle causing gate 62 to be operated to transfer the operation code (SP) into the operation register 65 and the bits 21–35, which are normally an address field, into the storage address register 64. The controls 66 recognize that the contents of the operation register 65 indicate a special instruction causing an output on the special instruction line from the controls 66, which operates the gate 69 to transfer the destination field column 214 of the instruction to the controls 66. Since the destination field indicates that instruction 201 refers to the CPU, the control 66 output SPCPU will have a signal applied to it which operates gate 90. The memory group selector field bits 21–23 will be transferred from the storage address register 64 via gate 89, bus 94 and gate 90 to the group selector register 95, which now stores a code (000) which indicates that memories A and B have been selected.

The next instruction 202 of the CPU program is handled in a similar manner. However, when the destination field bits 24–25 are placed in the controls 66 it is recognized that the instruction 202 refers to the data synchronizer unit 78. Therefore, controls 66 output SPDSU 1 is activated to enable gate 91. As a result, the memory group selector field bits 21–23 are transferred via gate 89, bus 94 and gate 91 to the group selector register 96. This register, which now contains the bit configuration 010 specifies the pair of memories A and D.

The following instruction 203 of the CPU program is handled in a manner identical to instruction 202 causing the bit configuration 011 to be entered into the group selector register 97, in order to indicate that the pair of memories B and C have been selected.

The CLA instruction 204 of the CPU program is entered into the storage buffer register 61 via the bus 60. The controls 66 indicate that this is an instruction cycle by placing a signal on the instruction line causing gate 62 to be operated. The operation code field of the instruction is entered into the operation register 65, the address field is entered into the storage address register 64 and the tag bits 13 and 17 are entered into the CPU tag register 67. The controls 66 recognize the operation field of the instruction in the operation register 65 to be that of a normal instruction causing a signal to appear on the normal instruction output which operates gate 70. Since the data synchronizers 78 through 80 are not at this time requesting service there will be a signal on the Not DSU cycle line 87 which causes operation of gates 68, 72, 100, 108 and 109. The operated gates 70 and 68 pass the address (043) stored in the storage address register 64 to bus 55. Operation of the gates 108 and 109 causes the contents of the CPU tag register to be applied to inputs 105 and 106 of the memory selector 104. Operation of gate 100 causes the contents of the group selector 95 to be applied to bus 99 of the memory selector 104. Referring to FIGURE 3*b* group selector register 95 inputs (000) cause an output AB from AND circuit 114, which is applied to AND circuit 120 that is enabled by a 1-bit on line 105. As a result a signal appears, via OR circuits 132 and 150, at the select MA output of the memory selector 104. Referring again to FIGURE 3*a*, the select MA signal causes gate 56 to be operated transferring the address (043) on bus 55 specified by instruction 204 to the storage selector register 51. The contents of location 043 in memory 47 are transferred via bus 60 to the storage buffer register 61. The control 66 having completed interpretation of the instruction cause a shift to a data cycle by transferring the signal on the instruction output of the control 66 to the data output, operating gate 71. The contents of the storage buffer register 61 are therefore transferred via gate 71 and gate 72 to the arithmetic and logical circuits 73 wherein an accumulator is cleared and the data word is entered.

An ADD instruction 205 is handled in a similar manner to the CLA instruction 204 just described. Again, the operation of the gate 100 causes the contents (000) of the group selector register 95 to be applied to the input 99 of the memory selector 104. Operation of the gates 108 and 109 cause the tag 13 (0-bit) and tag 17 (0-bit) to be applied to inputs 105 and 106 respectively of the memory selector 104. Referring to FIGURE 3*b* the signals on bus 99 again cause an output from AND circuit 114 which is applied to both AND circuits 120 and 126. Since the signal on line 105 is a 0-bit there will be an output from AND circuit 126 which is applied via OR circuits 138 and 151 to cause a signal at the output select MB of the memory selector 104. The select MB signal causes operation of gate 57 in FIGURE 3*a*, so that the address (043) is transferred from the storage address register 64 via gates 70 and 68 to bus 55 and the storage selection register 52. As a result the contents of the location 043 in memory 48 are placed into the storage buffer register 61 via bus 60. When the gate 71 is operated the data word at the location 043 of memory 48 is added to the data word, previously removed from location 043 of memory 47, in the arithmetic and logic circuits 73.

The STO instruction 206 and the CLA instruction 207 of the CPU program are executed in the same manner as the previous instructions just described. The STO instruction 206 causes the results of the addition of the two data words in the arithmetic and logic circuits 73 to be stored in location 326 of memory 47 via storage buffer register 61 and bus 60. The CLA instruction 207 initiates another addition "sub-routine" by placing the data word at location 044 of memory 47 into the arithmetic and logic circuit 73. At this time the data synchronizer 79 requires more information for writing onto a tape, causing a transfer to the DSU 2 program.

The normal command 218 of the DSU2 program is entered into the storage buffer register 61 via the bus 60. The controls 66 initially indicate an instruction cycle causing operation of the gate 62 to transfer the portion of the DSU command which is the equivalent of an operation word from the storage buffer register 61 to the operation register 65. The control 66, in conjunction with the information and the register 65 and a signal from the DSU cycle line 86, recognizes a normal command and place a signal on the control circuit 66 normal command output operating gate 75. Since this is a DSU2 cycle as indicated by an output from the data synchronizer 79 there will be a signal on the line DSU cycle 86 causing operation of gate 76 and preventing operation of gate 72, thus connecting the data synchronizers to the storage buffer register 61 to the exclusion of the arithmetic and logic circuits 73.

The address field of the command 218 is transferred from the storage buffer register 61 via the gates 75 and 76 and the bus 77 to the data synchronizer 79. The tag 18 (0-bit) and the tag 20 (0-bit) of the command are transferred via a similar route to the DSU2 tag register 83. The address field (270) of the command 218 is then applied to the bus 55 via the bus 81 and the gate 107. The DSU2 tag register 83 contents are applied to memory selector 104 inputs 105 and 106 via gates 110 and 111. The contents (011) of the group selector register 97 are applied to input 99 of the memory selector 104 via gate 102. Referring to FIGURE 3*b*, the input (011) from bus 99, the input (0-bit) at input 105 and the input (0-bit) at input 106 cause outputs from AND circuits 117 and 129. Therefore a signal is sent via OR circuits 141 and 152 to the select MC output of the memory selector 104. Referring back to FIGURE 3*a* the select MC signal is applied to gate 58 causing the address (270) on bus 55 to be placed in the storage select register 53. As a result the data word at the location 270 of the memory 49 is placed in the storage buffer register 61, and is transferred to the data synchronizer 79 for writing on its associated tape unit.

Subsequent commands 219, 220 and 221 of the DSU2 program are similarly executed causing the data words at locations 271, 272 and 273 of the memory 49 to be written by the tape unit associated with the data synchronizer 79. The data synchronizer 79 does not require any further service at this time so that the CPU program may be resumed.

The ADD instruction 208 of the CPU program is executed in the manner previously described with reference to the ADD instruction 205, causing the data word at the location 044 of the memory 48 to be added in the arithmetic and logic circuit 73 to the data word from the location 044 of the memory 47. After the execution of this instruction 208 the other data synchronizer 78 requires service to transfer information to memory locations. Therefore the CPU program is again interrupted.

The normal commands 222, 223 and 224 of the DSU1 program are handled in a manner identical to the previously described commands 218 through 221. In these commands 222, 223 and 224 the tags 18 and 20 are however one-bits. The group selector register 96, which contains the word 010, is transferred via gate 101 to the input 99 of the memory selector 104. Referring to FIGURE 3*b*, in each case for commands 222, 223 and 224, the input at bus 99 will cause an output from AND circuit 116 which is applied to AND circuits 122, 128 and 146. The signals at inputs 105 and 106 are both one-bits causing an output, each time, from AND circuits 122 and 156. The output from AND circuit 146 is alone sufficient to cause outputs from OR circuits 134 and 140 which are applied to OR circuits 150 and 153 to cause signals on lines select MA and select MD. As a result, for each one of the commands 222, 223 and 224 the gates 56 and 59 will be operated to transfer the current address field to both the storage select register 51 and the storage select register 54. Therefore, three data words read from the tape unit associated with the data synchronizer 78 will be written into locations 272, 273 and 274 of both memories 47 and 50 via the storage buffer register 61 and the bus 60. When the three commands 222, 223 and 224 are completed, the data synchronizer 78 does not require any more service, and the CPU program may be resumed.

Three instructions 209, 210 and 211 of the CPU program are now executed in the manner previously described. The STO instruction 209 causes the results of the addition of the data word at location 044 of memory 47 and the data word at location 044 in memory 48 to be stored in location 327 of memory 47. Instructions 210 and 211 cause two new data words, one from location 045 of memory 47 and the other from location 045 of memory 48 to be entered into the arithmetic and logic circuits. The CPU program continues as described until one of the data synchronizers requires service, at which time the data synchronizer program is again entered.

There has been described a device which permits the memory capacity of an electronic data processing system to be expanded even though the addressing capacity of an instruction word in the system is limited. A special instruction may precede a group of normal instructions, which special instruction specifies two or more memory units. Each normal instruction following a special instruction selects one of the prespecified memory units for use by its address portion. Since normal instructions are of various types a special instruction may be provided for each type of normal instruction. Thus different groups of memory units may be prespecified for each different type of normal instruction. Normal instructions of one type may select a memory from one group of memory units while another type of normal instruction may select a memory from another group of memory units. Further, it is possible for selected normal instructions referring to the same group of memory units to refer to all of the memory units in the group simultaneously.

In the claims:

1. The combination comprising:

memories having addressable locations;

a source of instructions of two kinds respectively consisting of a first kind of instructions each containing an address portion for addressing the locations in at least one memory and also containing a tag portion for designating a selection among a specified plurality of memories, and a second kind of instructions each containing a memory group selection portion;

first control means, connected to said memories and to said source, having a group selection portion responsive to said memory group selection portion in each instruction of said second kind to specify a plurality of memories;

second control means, connected to said memories and to said source, having a memory selection portion responsive to said tag portion in each instruction of said first kind to select at least one memory from said specified plurality of memories; and third control means, connected to said memories and to said source, having an address selection portion responsive to said address portion in each instruction of said first kind to address locations in a memory selected by said second control means.

2. Memory expansion apparatus, comprising:

more than two memories, each having addressable locations:

a source of instructions including instructions of a first kind, having address and control fields, and instructions of a second kind, having a control field;

first control means, connected to said memories and to said source, having a group selection portion operable in response to control fields of said second kinds of instructions to specify a plurality of said memories;

second control means, connected to said memories and to said source, having a memory selection portion operable in response to control fields of said first kinds of instructions to select a number of said plurality of memories specified by said first control means; and third control means, connected to said memories and to said source, having an address selection portion operable to transfer the address fields of instructions of said first kind to said selected number of memories.

3. Apparatus operable in accordance with programs of successively executed instructions including normal instructions, each having an address field, and a first and a second tag field each settable to a one state or a zero state, and special instructions each having a group selection field, comprising:

a number, greated than two, of memory units each memory unit having addressable locations;

a number of addressing means, each one of which is connected to a different one of said memory units, each operable by the address field of a normal instruction to gain access to a location in the connected memory unit specified by the address field;

an address register for storing the address field of a current normal instruction;

a number of gating means, each one of which is connected between said address register and a different one of said addressing means, each operable to transfer the current address field stored in said address register to the connected addressing means; and a selection control connected to said gating means, operable in response to the group selection field of a preceding special instruction and said first tag field of a current normal instruction to make one of said gating means operable in accordance with the second tag field of said normal instruction when said first tag field is set to said first state, and to make a plurality of said gating means operable when said first tag field is set to the zero state.

4. Apparatus for selecting ones of a plurality of memories, comprising:

a source of first instructions, designating memory pairs, and second instructions, selecting memories in one of two modes, said instructions being grouped into a plurality of programs;

first means for initially recording, in accordance with first instructions, a designation of memory pairs for each of said programs; and second means for subsequently selecting, in accordance with second instructions, in a first mode an individual memory, and in a second mode both memories, of the pair of memories designated in said first means for the particular program of which the second instruction is a part.

5. Apparatus for addressing locations in a memory, comprising:

first means connected to said memory initially operable for specifying a plurality of location groups in said memory;

second means connected to said memory operable subsequent to said first means for selecting a number of location groups from said plurality of location groups specified by said first means; and third means connected to said memory operable substantially simultaneously with said second means for gaining access to locations in said number of selected location groups.

6. In combination:

a plurality of memories, each having accessable locations for storing data;

a plurality of autonomous devices, connected to said memories, each independently operable to process data stored in said memories;

a source of instructions applicable to different ones of said autonomous devices, said instructions being of a number of types including a first and a second type;

a plurality of first means, one for each autonomous device, connected to said source, each responsive to instructions of said first type for indicating a pair of said memories;

a plurality of second means, one for each autonomous device, connected to said source, each responsive to instructions of said second type for indicating one of the pair of memories indicated by a corresponding one of said first means;

a plurality of third means, one for each autonomous device, connected to said source, each responsive to instructions of said second type operable to make said corresponding second means indication ineffective; and means interconnecting said memories and said autonomous devices, each autonomous device being given access to data locations in one memory specified in the corresponding ones of said second means and said first means when said corresponding third means is inoperative, and in both memories specified in the corresponding ones of said second means when said corresponding third means is operative.

7. Memory expansion apparatus, comprising:

more than two memories, each having addressable locations;

a source of instructions including instructions of a first kind, having address and control fields, and instructions of a second kind, having a control field;

first control means, connected to said memories and to said source, operable in response to control fields of said second kinds of instructions to specify a plurality of said memories;

second control means, connected to said memories and to said source, operable in response to control fields of said first kinds of instructions to select a number of memories, out of the plurality of memories specified by said first control means; and third control means, connected to said memories and to said source, operable to transfer the address fields of instructions of said first kind to said selected number of memories.

8. Apparatus operable in accordance with programs of successively executed instructions including normal instructions, each having an address field and a tag field, and special instructions, each having a group selection field, comprising:

a number, greater than two, of memory units each memory unit having addressable locations;

a number of addressing means, each one of which is connected to a different one of said memory units, each operable by the address field of a normal instruction to gain access to a location in the connected memory unit specified by the address field;

an address register for storing the address field of a current normal instruction;

a number of gating means, each one of which is connected between said address register and a different one of said addressing means, each operable to transfer the current address field stored in said address register to the connected addressing means; and a selection control connected to said gating means, operable in response to the group selection field of a preceding special instruction and the tag field of a current normal instruction to make one of said gating means operable.

9. Apparatus for selecting ones of a plurality of memories, comprising:

a source of first instructions, designating memory pairs, and second instructions, selecting individual memories of a pair, said instructions being grouped into a plurality of programs;

first means for initially recording, in accordance with first instructions, a designation of memory pairs for each of said programs; and, second means for subsequently selecting, in accordance with second instructions, an individual memory from the pair of memories designated in said first means for the particular program of which the second instruction is a part.

10. Apparatus for addressing locations in a memory, comprising:

first means connected to said memory initially operable for specifying a plurality of location groups in said memory;

second means connected to said memory operable subsequent to said first means for selecting a number of location groups from said plurality of location groups specified by said first means; and third means connected to said memory operable substantially simultaneously with said second means for gaining access to a single location in each of said number of selected location groups.

11. In combination:

a plurality of memories, each having accessible locations for storing data;

a plurality of autonomous devices, connected to said memories, each independently operable to process data stored in said memories;

a source of instructions applicable to different ones of said autonomous devices, said instructions being of a number of types including a first and a second type;

a plurality of first means, one for each autonomous device, connected to said source, each responsive to instructions of said first type for indicating a pair of said memories;

a plurality of second means, one for each autonomous device, connected to said source each responsive to instructions of said second type for indicating one of the pair of memories indicated by a corresponding one of said first means; and means interconnecting said memories and said autonomous devices, each autonomous device being given access to data locations in one memory specified in the corresponding ones of said second means and said first means.

12. Memory expansion apparatus, comprising:

more than two memories, each having addressable locations;

a source of instructions including instructions of a first kind, having address and control fields, and instructions of a second kind, having a control field;

first control means, connected to said memories and to said source, operable in response to control fields of said second kinds of instructions to specify a plurality of said memories;

second control means, connected to said memories and to said source, operable in response to control fields of said first kinds of instructions to select all of said plurality of memories specified by said first control means; and third control means, connected to said memories and to said source, operable to transfer the address fields of instructions of said first kind to all of said selected memories.

13. Apparatus operable in accordance with programs of successively executed instructions including normal instructions, each having an address field and a tag field, and special instructions, each having a group selection field, comprising:

a number, greater than two, of memory units each memory unit having addressable locations;

a number of addressing means, each one of which is connected to a different one of said memory units, each operable by the address field of a normal instruction to gain access to a location in the connected memory unit specified by the address field;

an address register for storing the address field of a current normal instruction;

a number of gating means, each one of which is connected between said address register and a different one of said addressing means, each operable to transfer the current address field stored in said address register to the connected addressing means; and a selection control connected to said gating means, operable in response to the group selection field of a preceding special instruction and the tag field of a current normal instruction to make a plurality of said gating means operable.

14. Apparatus for selecting ones of a plurality of memories, comprising:

a source of first instructions, designating memory pairs, and second instructions selecting memories, said instructions being grouped into a plurality of programs;

first means for initially recording, in accordance with first instructions, a designation of memory pairs for each of said programs; and second means for subsequently selecting, in accordance with second instructions, both of said pair of memories designated in said first means, for the particular program of which the second instruction is a part.

15. Apparatus for addressing locations in a memory, comprising:

first means connected to said memory initially operable for specifying a plurality of location groups in said memory;

second means connected to said memory operable subsequent to said first means for selecting a number of location groups from said plurality of location groups specified by said first means; and third means connected to said memory operable substantially simultaneously with said second means for gaining access to a single location in all of said number of selected location groups.

16. In combination:

a plurality of memories, each having accessable locations for storing data;

a plurality of autonomous devices, connected to said memories, each independently operable to process data stored in said memories;

a source of instructions applicable to different ones of said autonomous devices, said instructions being of a number of types including a first and a second type;

a plurality of means, one for each autonomous device, connected to said source, each responsive to instructions of said first type for indicating a pair of said memories; and means interconnecting said memories and said autonomous devices, operable by instructions of said second type to give each autonomous device access to data locations in the pair of memories specified in the corresponding one of said plurality of means.

References Cited by the Examiner

UNITED STATES PATENTS 3,061,192 10/1962 Terzian ---------- 340—172.5

OTHER REFERENCES

Chao, Eastern Joint Computer Conference, published December 1959.

Keister et al.: Design of Switching Circuits, D. Van Nostrand, 1956.

ROBERT C. BAILEY, *Primary Examiner.*

MALCOLM A. MORRISON, W. M. BECKER, R. RICKERT, *Examiners.*